Jan. 22, 1963 R. C. HARRISON 3,074,808
METHOD AND APPARATUS FOR COATING THE INTERIOR OF A PIPE
Filed Oct. 19, 1959
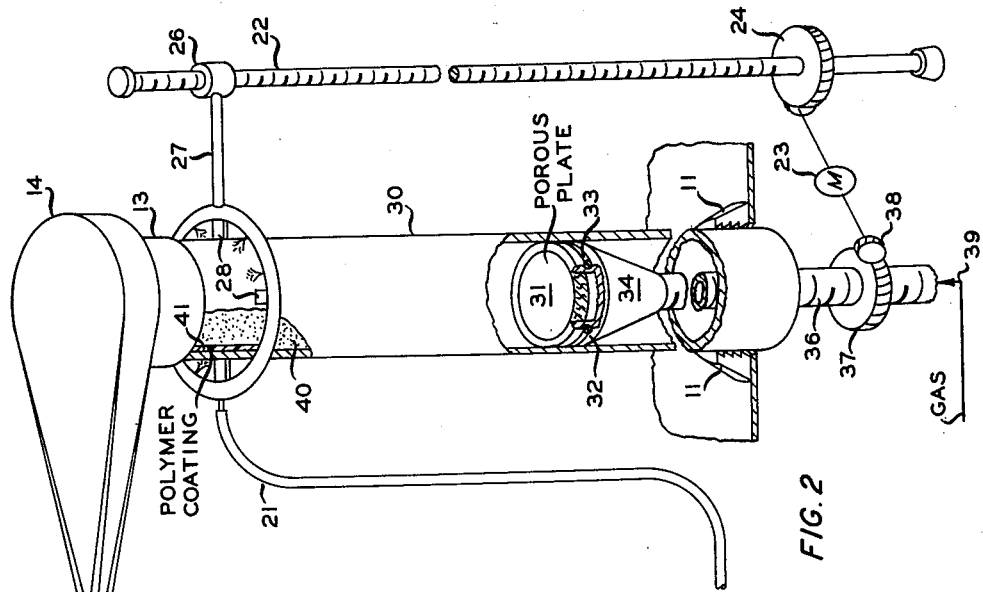
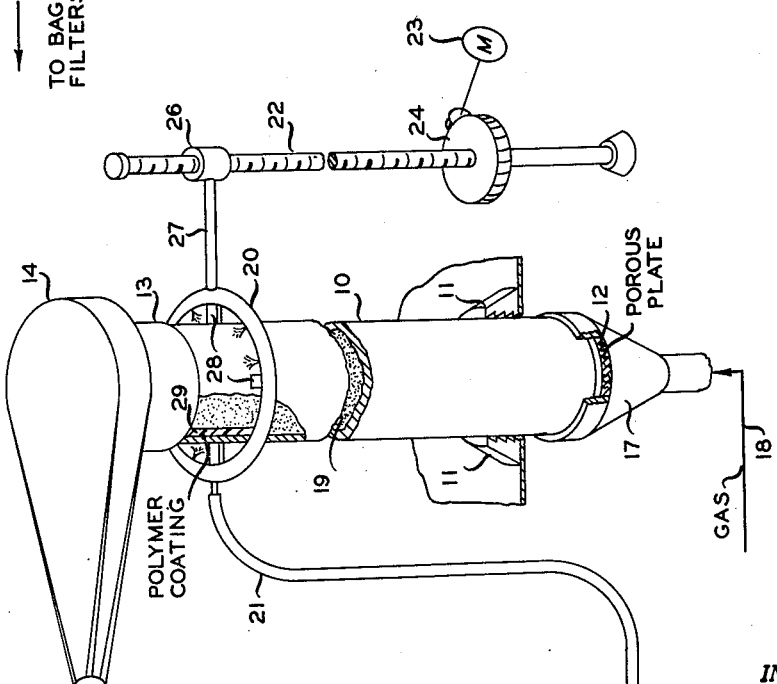
INVENTOR.
R. C. HARRISON
BY *Hudson & Young*
ATTORNEYS United States Patent Office 3,074,808
Patented Jan. 22, 1963

3,074,808
METHOD AND APPARATUS FOR COATING THE INTERIOR OF A PIPE
Roy C. Harrison, Bartlesville, Okla., assignor to Phillips Petroleum Company, a corporation of Delaware
Filed Oct. 19, 1959, Ser. No. 847,385
7 Claims. (Cl. 117—18)

This invention relates to a method of applying a coating of thermoplastic polymer to the interior of an elongated cylindrical structure using the fluidized bed technique. In another aspect the invention relates to apparatus suitable for coating the interior of pipes with thermoplastic polymer.

Metal pipe coated inside with a thermoplastic polymer such as polyethylene is useful for handling corrosive fluids, especially where the fluid pressures exceed the limits of plastic pipe. A number of methods for internal pipe coating have been advanced. Most of these involve an adaptation of the flame spraying technique wherein the pipe is heated and polymer is sprayed onto the heated pipe wall. In other methods polymer is blown through a heated pipe and what does not adhere to the pipe wall is collected in a cyclone or bag filter. Pipe has been coated by distributing polymer powder along its length after which the pipe is rotated and heated while in a substantially horizontal position. Although fluidized bed coating procedures have been adapted for coating relatively small articles, a satisfactory method of coating the interior of relatively large pipe has not been developed.

According to my invention, pipe and other elongated cylindrical structures such as tubings, casings, tank sections and the like can be coated internally using a fluidized bed technique. I accomplish this coating operation by positioning the pipe or similar structure with its elongated dimension in a vertical line, forming a fluidized bed of finely divided polymer within the structure, applying heat circumferentially to the outside of said structure beginning near the upper end thereof sufficiently to cause polymer particles striking the inner surface of the structure opposite the locus of heat application to adhere to the surface and fuse into a film, and slowly lowering the application of heat along the length of the structure at a uniform rate, thereby heating and coating the structure incrementally. The method of my invention enables the entire coating to be applied from a fluidized bed of substantially constant density. As polymer builds up on the pipe wall, the upper level of the fluidized bed falls but the change is gradual enough that the density of the bed is not altered appreciably. Since the coating progresses from top to bottom, the reduction in bed height does not affect the coating operation. Uniform linings are thereby provided with a relatively simple procedure. In another aspect which is especially suitable for lining long sections of pipe a movable fluidized bed of polymer is provided within the pipe. This entire bed is lowered with the application of heat as the coating progresses.

My invention also encompasses apparatus suitable for lining pipes with a thermoplastic coating. This apparatus comprises means for supporting the pipe in a vertical position, means for fluidizing a bed of polymer within the pipe and a ring heater disposed about the pipe which heater can be lowered to heat the pipe incrementally. Another aspect of my invention comprises means for lowering the entire fluidized bed in the pipe in coordination with the heater ring.

It is an object of my invention to provide a method of lining an elongated cylindrical structure with thermoplastic polymer. Another object is to provide a method of utilizing the fluidized bed technique to coat the interior of pipe. Still another object is to provide apparatus suitable for lining pipe and the like with a coating of thermoplastic polymer. Another object of my invention is to provide a method and apparatus which coats the interior of pipe using a finely divided thermoplastic polymer in a dense phase fluidized bed which does not change in density appreciably at the locus of polymer application throughout the coating process. Other objects, advantages and features will be apparent to those skilled in the art from the following discussion and drawings in which:

FIGURE 1 is a diagram in elevation and partly in section depicting the method and apparatus of my invention using a stationary fluidized bed, and FIGURE 2 is a diagram in elevation and partly in section depicting my invention using a movable fluidized bed.

A wide variety of thermoplastic materials can be applied to the interior of pipes by my invention and in general any high molecular weight thermoplastic polymer which has a relatively sharp melting point can be used. Especially suitable are polymers such as polyethylene, polystyrene, polyvinylchloride and nylon. I prefer to use the high molecular-weight polymers of 1-olefins having from 2 to 8 carbon atoms per molecule such as polyethylene, polypropylene, and copolymers of ethylene with propylene and 1-butene. Normally solid polymers of this type can be prepared by the method described in the patent to J. P. Hogan et al., U.S. 2,825,721. Also suitable for use in the method of my invention is polyethylene of the conventional low density type prepared by methods utilizing extremely high pressures of 500 atmospheres and above.

Elongated cylindrical structures such as pipes, vessels and the like, constructed from metal or ceramic material can be readily lined by my process. Coatings of thermoplastic polymers can also be applied to wood.

Before application of the polymer lining, it is necessary to prepare the surface for coating by removing all foreign material such as rust, scale, dust or grease. Grease or oil can be easily removed by washing with a solvent such as alcohol or acetone or by dipping in a caustic bath. Sand blasting is most effective in removing rust and scale. It is preferred that the surface to be coated be slightly roughened in order to obtain good adhesion of the polymer thereto. Glass or steel structures with smooth surfaces can be slightly grit-blasted and aluminum pipe can be treated with caustic to roughen the interior surface.

Pipe should have an interior diameter of at least 3 inches and preferably at least 5 inches to be satisfactorily coated by the dense phase fluidized bed technique. Pipe or vessels having a diameter up to 3 feet can be coated by my process, but structures having diameters much greater than this become unwiledy and are better lined by prior art methods. Pipe sections up to 12 feet long can be coated by this method using a stationary porous plate to support the fluidized bed and when a movable porous plate is used, the limits on the length of the pipe is solely a matter of mechanical consideration. Generally, it will not be desirable to coat pipe sections longer than 30 feet by this method.

The polymer to be employed in the fluidized bed should be finely divided although particle size and particle size distribution does not appear to be extremely critical. Generally, the size of the polymer particles falls in the range of 40 to 200 mesh. Finely divided polymer is fluidized by any gas which is non-oxidizing under the conditions; and either air or nitrogen, depending upon the polymer, is used for fluidizing. A gas velocity of 0.5 to 30 feet per second will effect a dense phase fluidized bed and it is preferred that the minimum possible velocity be employed.

Formation of fluidized beds of polymer are well known in the art of dip coating and the formation of the fluidized bed within the cylindrical structure for coating according to the method of my invention is very similar. Polymer powder is placed in the pipe or vessel on the porous diaphragm and the fluidized gas is passed through the diaphragm causing the polymer bed to expand approximately 1½ times and assume the appearance of a slowly boiling liquid. If the flow of gas is too great, the bed will boil vigorously resulting in considerable loss of fine powder. The density of the fluidized bed when polyethylene is employed will be about 5 to 20 pounds per cubic foot. One advantage of my invention is that during the coating process, the bed density remains substantially constant; and since the coating is applied to the surface of the pipe incrementally, there is no sudden change in bed characteristics.

The pipe is heated after the polymer has been fluidized therein by applying heat circumferentially to the outside of the pipe with a heating ring. The heating ring can be either gas fired or electric, such as a resistance coil. Induction heating for metal pipe can also be used. The heat is applied to the pipe beginning at the upper end and the heating ring is lowered slowly at a rate dependent upon the size and thickness of the pipe, its thermal conductivity, and the melting point of the polymer being applied. Generally, the heating ring is lowered at a rate of about 4 inches to 6 feet per minute, the higher rates being employed for thin wall pipe or highly conductive material. The pipe should be heated to a temperature sufficient to cause the polymer in the fluidized bed to adhere to the inner surface of the pipe opposite the locus of heat application. When applying a polyethylene coating, the pipe can be heated to a temperature in the range of 380 to 450° F. As a general rule, metal pipe should be heated to a temperature from 25 to 100° F. above the softening temperature of the thermoplastic material being applied as a coating. As the heating ring is moved downwardly, the pipe is heated incrementally and polymer particles adhere to the heated wall, fusing into a coating. The latent heat in the wall of the pipe causes the coating to fuse and become more smooth after the heating ring has moved down the pipe. To aid in controlling the coating condition, the temperature of the fluidizing gas can be adjusted to preheat the polymer or cool the polymer coating after the heating ring has moved to a lower portion of the pipe. The tendency of the coating to run down the pipe because of overheating is considerably reduced because of the relatively quick cooling which can be provided by the fluidizing gas itself.

After the heating ring has moved the full length of the pipe and the coating operation is completed, the polymer remaining in the pipe can be removed by increasing the air flow and carrying the polymer particles out the top of the pipe into a solids collector, such as a bag filter. If it is desired to further condition the surface of the coating, a hot gas can be fed through the pipe at this time causing the polymer surface to fuse and become more smooth. This treatment may be necessary when coating relatively thin wall structures which do not have a high residual heat in the pipe walls. During such a curing or sintering operation, the pipe can be rotated at a high speed so that centrifugal force will serve to even the thickness of the coating on the pipe wall.

To more fully explain my invention reference is now made to FIGURE 1 of the drawings which shows a pipe being coated using a stationary porous plate. The pipe 10 is positioned with its elongated dimension in a vertical line and is held by pipe supports 11 so that its lower end registers over porous plate 12. An extension collar 13 is positioned over the upper end of pipe 10 so that the fluidized bed can be expanded the full length of the pipe. Collar 13 is attached to a hood 14 which is connected by conduit 16 to suitable solids collecting means, such as bag filters. Any fines which are accidentally carried over during the fluidization process are collected by such filters or as previously pointed out such means can be used for removal of polymer from the pipe after the coating process has been completed.

Below porous plate 12 is a plenum 17 to which gas is supplied through conduit 18. As previously explained, powdered polymer is placed on the porous plate to a depth of about two-thirds the length of the pipe. Gas admitted through conduit 18 passes upwardly through plate 12 and the polymer bed causing the bed to expand approximately 1½ times and fill the pipe with a dense phase fluidized bed 19. Heat is applied to the pipe by heating ring 20 which in this embodiment is shown as a gas-fired heating ring, gas being supplied through flexible hose 21. The heating ring is lowered the length of the pipe by threaded rod 22 which is driven by motor 23 through the gear chain 24. A threaded collar 26 is positioned on rod 22 and is connected to ring 20 by arm 27. Ring 20 is held in concentric position about the pipe by guide members 28. Rotation of rod 22 causes collar 26 and hence ring 20 to move slowly down the length of pipe 10 so that the pipe wall is heated incrementally. As the pipe wall reaches the temperature to which the polymer is fused, particles of the fluidized bed striking the wall of the pipe adhere to it and fuse into a coating 29.

Another aspect of my invention is illustrated in FIGURE 2 which shows the use of a movable porous plate which can be lowered within the pipe at a rate coordinated with the movement of the heater ring. In this embodiment a longer pipe 30 can be coated since there is no limitation with respect to the height of the dense-phase fluidized bed. Powdered polymer is placed on porous plate 31, as previously described in connection with FIGURE 1, although in this embodiment the porous plate is positioned well up within the pipe so that less polymer can be charged for the coating operation and a relatively small fluidized bed can be used to coat a long pipe. Porous plate 31 is positioned traversely within pipe 30 having a diameter substantially equal to the internal diameter of the pipe so that the cross section thereof is completely filled. Plate 31 is held in position and collar 32 which carries O-ring 33 forms a tight slidable seal with the pipe wall. Plenum 34 is positioned below the porous plate and attached to collar 32. The plenum and plate assembly is supported by threaded tubing 36 which passes through the threaded gear 37, driven through gear 38 by synchronous motor 23. Tubing 36 is held in non-rotatable position by suitable means, such as a key and keyway not shown, so that as gear 37 is rotated, tubing 36 and the porous plate assembly is raised or lowered. Fluidizing gas is supplied to tubing 36 through a flexible hose 39. In the manner described in connection with FIGURE 1, the polymer is formed into a dense phase fluidized bed 40 and applied as a coating 41 on the wall of the pipe. The heater ring is lowered as previously described while simultaneously lowering the porous plate assembly and the fluidized bed at a coordinated rate.

In addition to maintaining uniform bed characteristics throughout the coating process, the method and apparatus of my invention which involves incrementally heating a cylindrical structure from top to bottom while maintaining therein a dense phase fluidized bed of polymer, prevents overheating of the bed itself and substantially eliminates any tendency of the particles within the center of the bed to agglomerate because of softening. Other advantages of my invention will be made more apparent by the following example which is presented as being typical in regard to operating conditions and should not be interpreted as limiting my invention unduly.

*Example*

An 8 inch O.D. schedule 40 seamless API line pipe, 10 feet long, is lined on the inside with a 0.040 inch coating of polyethylene employing the following procedure.

The pipe is suspended vertically with its lower end registering over a porous diaphragm and an extension collar 2 feet long is attached to its upper end. The pipe is filled to a depth of 7 feet with 75 pounds of finely divided polyethylene having an average particle size of 100 mesh. The polyethylene employed is prepared by a low pressure method utilizing a chromium oxide catalyst and has a softening point of about 260° F. Nitrogen is then passed through the porous diaphragm upwardly through the polymer bed at a superficial velocity of 5 feet per second. The polymer bed becomes fluidized and increases in bed depth to 10.5 feet.

A gas-fired heating ring positioned at the top of the pipe heats the pipe circumferentially to a temperature of 400° F. and polymer from the fluidized bed adheres to the interior of the pipe. The heating ring is moved uniformly down the length of the pipe at a rate of 2 feet per minute heating the pipe incrementally to 400° F. and then permitting the heated portion of the pipe to cool as the heating ring passes on. The retained heat in the pipe wall fuses the adhering polymer into a smooth, uniform coating.

The above procedure is repeated to coat a pipe 20 feet long using a movable porous diaphragm within the pipe positioned initially 3 feet below the top of the pipe and the heating ring. Polyethylene is fluidized with nitrogen to a bed depth of 4 feet and the pipe is heated as before. The porous diaphragm and hence the polymer bed is lowered at the same rate as the heating ring. A smooth lining 0.040 inch thick is thus formed throughout the entire length of the pipe.

Softening point as used in this specification is determined by plotting softness values vs. temperature and the temperature at which the slope of the resulting curve equals 0.0035 softening units per degree F. is the softening temperature. "Softness" is determined by the method of Karrer, Davis and Dieterich, Industrial and Engineering Chemistry (Analytical Edition) 2, 96 (1930).

As will be evident to those skilled in the art, various modifications of this invention can be made, or followed, in the light of the foregoing disclosure and discussion, without departing from the spirit or scope thereof.

I claim:

1. A method of applying thermoplastic polymer powder in a coating to the interior of a pipe which comprises placing said pipe in a vertically elongated position over a porous diaphragm adapted to support said powder, filling said pipe approximately two-thirds full with finely divided thermoplastic polymer powder, passing relatively cool inert gas upwardly through said diaphragm and said pipe thereby fluidizing said polymer and causing said powder to fill said pipe, heating circumferentially the outside of said pipe at the upper end thereof sufficiently to cause the polymer powder to fuse and adhere to the inner surface of said pipe opposite the locus of heat application, slowly moving the application of heat downwardly along substantially the entire length of said pipe thereby incrementally heating said pipe and fusing polymer powder thereto, and thereafter cooling the polymer coating adhering to the pipe by contact with said inert gas.

2. The method of claim 1 wherein said polymer is polyethylene.

3. The method of claim 1 wherein the velocity of said inert gas is increased when the entire pipe has been heated thereby removing the remaining polymer particles overhead and further cooling the coating.

4. A method of applying thermoplastic polymer powder in a coating to the interior of a pipe which comprises positioning said pipe so that its length is in a vertical line, forming a fluidized bed of finely divided thermoplastic polymer powder only in the upper portion of said pipe, applying heat to the outside of at least a circumferential segment of said portion of said pipe sufficient to cause polymer powder contacting the opposite inner wall of said segment to adhere thereto and fuse, slowly lowering said fluidized bed throughout substantially the entire length of said pipe, and lowering the application of heat to said pipe at a rate coordinated with the lowering of said fluidized bed.

5. A method of applying thermoplastic polymer powder in a coating to the interior of pipe which comprises positioning said pipe so that its length is in a vertical line, positioning transversely within the upper portion of said pipe a porous diaphragm adapted to support said powder and having a diameter approximately equal to the internal diameter of said pipe, depositing finely divided thermoplastic polymer powder on said diaphragm, passing inert gas through said diaphragm thereby fluidizing said polymer powder in a dense phase fluidized bed only in said upper portion of said pipe, applying heat to the outside of at least a circumferential segment of said portion of said pipe sufficient to cause polymer powder contacting the inner wall of said segment to adhere thereto and fuse, and simultaneously slowly lowering said diaphragm and the application of heat at coordinated rates along substantially the entire length of said pipe so that said polymer powder is applied to said pipe incrementally while said inert gas cools the coating above the locus of heat application.

6. The method of claim 5 wherein said polymer is a polymer of at least one mono-1-olefin having from 2 to 8 carbon atoms per molecule.

7. Apparatus for applying a coating of thermoplastic polymer to the interior of a pipe comprising, in combination, means for supporting said pipe in a vertically elongated position, a porous distributor plate slidably positioned transversely in said pipe and adapted to support powder for the fluidized bed at rest, the diameter of said plate being approximately equal to the internal diameter of said pipe, a plenum chamber below and attached to said plate, a conduit leading to said chamber from below, said conduit being connected at its other end to a gas supply, means for moving said porous plate and plenum assembly vertically downward through said pipe, a heater ring disposed around said pipe, and means for moving said heater ring vertically downward outside said pipe at a rate coordinated with said moving of said porous plate.

References Cited in the file of this patent

UNITED STATES PATENTS

| | | |
|---|---|---|
| 2,844,489 | Gemmer | July 22, 1958 |
| 2,880,109 | Current et al. | Mar. 31, 1959 |
| 2,981,631 | Nagel | Apr. 25, 1961 |
| 3,004,861 | Davis | Oct. 17, 1961 |

FOREIGN PATENTS

| | | |
|---|---|---|
| 1,051,175 | Germany | Feb. 19, 1959 |

OTHER REFERENCES

Kunststoffe: Volume 47, No. 8, 1957, pages 510, 511 and 512.